United States Patent
Kjorlaug et al.

(10) Patent No.: US 7,820,257 B2
(45) Date of Patent: Oct. 26, 2010

(54) PREFORMS FOR PREPARING LIGHTWEIGHT STRETCH BLOW MOLDED PET COPOLYMER CONTAINERS AND METHODS FOR MAKING AND USING SAME

(75) Inventors: Christopher C. Kjorlaug, Alpharetta, GA (US); Linda K. Anthony, legal representative, Alpharetta, GA (US); Thomas H. Milton, legal representative, Greensboro, NC (US); Yu Shi, Piscataway, NJ (US); Long Fei Chang, Silvania, OH (US); Roger Ian Moore, Beccles (GB)

(73) Assignee: The Coca-Cola Company, Atlanta, GA (US)

( * ) Notice: Subject to any disclaimer, the term of this patent is extended or adjusted under 35 U.S.C. 154(b) by 617 days.

(21) Appl. No.: 11/127,037

(22) Filed: May 11, 2005

(65) Prior Publication Data

US 2006/0257603 A1 Nov. 16, 2006

(51) Int. Cl.
 *B32B 1/02* (2006.01)
(52) U.S. Cl. .................... 428/35.7; 428/36.92; 428/480
(58) Field of Classification Search ................ 428/35.7, 428/36.92, 480
 See application file for complete search history.

(56) References Cited

U.S. PATENT DOCUMENTS

| | | |
|---|---|---|
| 3,499,873 A | 3/1970 | Kuehne et al. |
| 3,654,231 A | 4/1972 | Brozek |
| 3,900,120 A * | 8/1975 | Sincock .................... 428/542.8 |
| 3,960,807 A | 6/1976 | McTaggart |

(Continued)

FOREIGN PATENT DOCUMENTS

EP 0135677 4/1984

(Continued)

OTHER PUBLICATIONS

Sakellarides, Stefano, Modifying PET Crystallization To Improve Container Processing, Plastics Engineering 33-35 (Dec. 1996).
"Nylon-MXD6 (PA-MXD6)," posted at the Mitsubishi Chemical Inc.'s Website, 21 pages.
Maeda, Y., et al., "Effect of Antiplasticization on Gas Sorption and Transport. I. Polysulfone," Journal of Polymer Science: Part B: Polymer Physics, vol. 25, 957-980 (1987).

(Continued)

*Primary Examiner*—Rena L Dye
*Assistant Examiner*—Walter B Aughenbaugh
(74) *Attorney, Agent, or Firm*—Sutherland Asbill & Brennan LLP

(57) ABSTRACT

An injection molded preform for making a stretch blow molded container having an overall stretch ratio of from about 12 to about 16, wherein the overall stretch ratio is a product of a hoop stretch ratio and an axial stretch ratio, wherein the hoop stretch ratio is from about 5.6 to about 6.5, wherein the axial stretch ratio is from about 2.4 to about 2.7, and wherein the preform comprises a CG PET Copolymer having a free blow volume of from about 650 to about 800 ml measured at 100° C. and 90 psi using a 25 gram weight preform designed for a 500 ml container with a maximum diameter of 65 mm and a height of 200 mm from below the container finish and having a hoop stretch ratio of 5.5 and an axial stretch ratio of 2.6. This invention also relates to a method of making such preforms and stretch blow molded containers and methods of making the same.

6 Claims, 1 Drawing Sheet

U.S. PATENT DOCUMENTS

| | | | |
|---|---|---|---|
| 3,989,664 A | 11/1976 | Kawase et al. | |
| 4,250,078 A | 2/1981 | McFarlane et al. | |
| 4,418,116 A | 11/1983 | Scott | |
| 4,420,581 A | 12/1983 | McFarlane et al. | |
| 4,474,918 A | 10/1984 | Seymour et al. | |
| 4,574,148 A | 3/1986 | Wicker et al. | |
| 4,618,515 A | 10/1986 | Collette et al. | |
| 4,665,682 A | 5/1987 | Kerins et al. | |
| 4,820,795 A | 4/1989 | Hirata et al. | |
| 4,824,882 A | 4/1989 | Nakamura et al. | |
| 4,847,314 A | 7/1989 | Tortorello et al. | |
| 4,882,410 A | 11/1989 | Neugebauer et al. | |
| 5,021,515 A | 6/1991 | Cochran et al. | |
| 5,059,356 A | 10/1991 | Nakamura et al. | |
| 5,067,622 A * | 11/1991 | Garver et al. | 215/381 |
| 5,162,091 A | 11/1992 | Ishii et al. | |
| 5,235,027 A | 8/1993 | Thiele et al. | |
| 5,250,333 A | 10/1993 | McNeely et al. | |
| 5,281,387 A | 1/1994 | Collette et al. | |
| 5,283,295 A | 2/1994 | Light et al. | |
| 5,286,557 A | 2/1994 | Jacob et al. | |
| 5,302,686 A | 4/1994 | Tanaka et al. | |
| 5,362,431 A | 11/1994 | Guerrini et al. | |
| 5,378,748 A | 1/1995 | Katsumata et al. | |
| 5,405,565 A | 4/1995 | Sumida et al. | |
| 5,409,967 A | 4/1995 | Carson et al. | |
| 5,409,983 A | 4/1995 | Jones et al. | |
| 5,460,903 A | 10/1995 | St. Aubyn Hubbard et al. | |
| 5,473,161 A | 12/1995 | Nix et al. | |
| 5,475,045 A | 12/1995 | Baker et al. | |
| 5,504,128 A | 4/1996 | Mizutani et al. | |
| 5,506,014 A | 4/1996 | Minnick | |
| 5,573,820 A | 11/1996 | Harazoe et al. | |
| 5,582,788 A | 12/1996 | Collette et al. | |
| 5,614,141 A | 3/1997 | Sumida et al. | |
| 5,631,054 A | 5/1997 | Hosokawa et al. | |
| 5,641,548 A | 6/1997 | Yamamoto et al. | |
| 5,656,719 A | 8/1997 | Stibal et al. | |
| 5,700,554 A | 12/1997 | Speer et al. | |
| 5,744,056 A | 4/1998 | Venkateshwaran et al. | |
| 5,798,183 A * | 8/1998 | Hosono et al. | 428/458 |
| 5,888,598 A | 3/1999 | Brewster et al. | |
| 5,925,710 A | 7/1999 | Wu et al. | |
| 5,939,516 A | 8/1999 | Greaves et al. | |
| 5,945,460 A | 8/1999 | Ekart et al. | |
| 5,948,864 A | 9/1999 | Rajagopalan | |
| 5,976,653 A | 11/1999 | Collette et al. | |
| 5,980,797 A | 11/1999 | Shelby et al. | |
| 6,019,933 A | 2/2000 | Takada et al. | |
| 6,060,140 A | 5/2000 | Sprayberry et al. | |
| 6,071,599 A | 6/2000 | Kosuge et al. | |
| 6,077,904 A | 6/2000 | Dalgewicz et al. | |
| 6,099,778 A | 8/2000 | Nelson et al. | |
| 6,150,450 A | 11/2000 | Sekiyama et al. | |
| 6,150,454 A | 11/2000 | Wu et al. | |
| 6,159,416 A * | 12/2000 | Kawakami et al. | 264/531 |
| 6,180,749 B1 | 1/2001 | Kim et al. | |
| 6,230,547 B1 | 5/2001 | Carroll | |
| 6,276,994 B1 | 8/2001 | Yoshida et al. | |
| 6,284,866 B1 | 9/2001 | Schiavone | |
| 6,309,718 B1 | 10/2001 | Sprayberry et al. | |
| 6,320,014 B1 | 11/2001 | Takahashi et al. | |
| 6,333,363 B1 | 12/2001 | Imashiro et al. | |
| 6,335,422 B2 | 1/2002 | Schiavone et al. | |
| 6,344,166 B1 * | 2/2002 | Aoki et al. | 264/521 |
| 6,355,319 B1 | 3/2002 | Nakamachi et al. | |
| 6,458,314 B1 | 10/2002 | Al Ghatta | |
| 6,485,804 B1 | 11/2002 | Nakamachi et al. | |
| 6,489,386 B1 | 12/2002 | Plotzker et al. | |
| 7,226,648 B2 | 6/2007 | Al Ghatta et al. | |
| 2002/0010285 A1 | 1/2002 | Nakamachi | |
| 2002/0119267 A1 | 8/2002 | Himmelmann et al. | |
| 2002/0128427 A1 | 9/2002 | Schaaf et al. | |
| 2002/0198331 A1 | 12/2002 | Nishihara et al. | |
| 2003/0001317 A1 | 1/2003 | Stafford et al. | |
| 2003/0099794 A1 | 5/2003 | Sasaki et al. | |
| 2003/0116526 A1 | 6/2003 | Mehanna | |
| 2004/0013893 A1 | 1/2004 | Nakaya et al. | |
| 2004/0091651 A1 | 5/2004 | Rule | |
| 2004/0116619 A1 | 6/2004 | Moad et al. | |
| 2004/0236065 A1 | 11/2004 | Denis et al. | |
| 2005/0100696 A1 | 5/2005 | Shi et al. | |
| 2005/0118371 A1 | 6/2005 | Shi et al. | |
| 2005/0153084 A1 | 7/2005 | Shi et al. | |
| 2005/0221036 A1 | 10/2005 | Shi et al. | |
| 2005/0260371 A1 | 11/2005 | Shi et al. | |
| 2006/0257602 A1 | 11/2006 | Shi et al. | |
| 2006/0257603 A1 | 11/2006 | Shi et al. | |

FOREIGN PATENT DOCUMENTS

| | | |
|---|---|---|
| EP | 0356343 | 2/1990 |
| EP | 0395233 | 10/1990 |
| EP | 0395237 | 10/1990 |
| EP | 0415859 | 3/1991 |
| EP | 0532988 | 3/1993 |
| EP | 0554950 | 11/1993 |
| EP | 0678554 | 10/1995 |
| EP | 0707625 | 4/1999 |
| EP | 1433817 | 6/2004 |
| EP | 1518876 | 3/2005 |
| JP | 54154468 | 12/1979 |
| JP | 5255492 | 10/1993 |
| JP | 05293878 | 11/1993 |
| JP | 07268085 | 10/1995 |
| JP | 09076336 | 3/1997 |
| JP | 2002321273 | 11/2002 |
| JP | 2003127211 | 5/2003 |
| JP | 2003159739 | 6/2003 |
| JP | 2003300209 | 10/2003 |
| NL | 1006498 | 1/1999 |
| WO | 9401268 | 1/1994 |
| WO | 98/41559 | 9/1998 |
| WO | 01/56896 | 8/2001 |
| WO | 01/83193 | 11/2001 |
| WO | 2005/014254 | 2/2004 |
| WO | 2004/041496 | 5/2004 |
| WO | 2004/113414 | 12/2004 |

OTHER PUBLICATIONS

Maeda, Y., et al., "Effect of Antiplasticization on Gas Sorption and Transport. II. Polysulfone," Journal of Polymer Science: Part B: Polymer Physics, vol. 25, 981-1003 (1987).

Maeda, Y., et al., "Effect of Antiplasticization on Gas Sorption and Transport. III. Polysulfone," Journal of Polymer Science: Part B: Polymer Physics, vol. 25, 1005-1016 (1987).

Maxwell, et al., "Secondary relaxation processes in polyethylene terephthalate-additive blends: 2. Dynamic mechanical and dielectric investigations," Polymer, vol. 39, Num. 26, 6851-6859 (1998).

Robeson, L. M., et al., "Secondary Loss Transitions in Antiplasticized Polymers," Polymer Science, Part B, vol. 7, 35-40 (1969).

Van Krevelen, D. W., "Properties of Polymers: Their Correlation with Chemical Structure; Their Numerical Estimation and Prediction from Additive Group Contributions," Elsevier Science B.V., Third Completely Revised Revision (1997), p. 189-225 (Chapter 7 of *Properties of Polymers . . . :* Chapter 7 entitled "Cohesive Properties and Solubility").

MPS Europe, "Molding of PET Containers," http://www.mps-europe.com/pet-containers.php (Aug. 22, 2008).

* cited by examiner

PREFORMS FOR PREPARING LIGHTWEIGHT STRETCH BLOW MOLDED PET COPOLYMER CONTAINERS AND METHODS FOR MAKING AND USING SAME

FIELD OF THE INVENTION

This invention relates to preform designs and preforms made therefrom, as well as making such preforms. The present invention also relates to stretch blow molded containers and methods of making the same.

BACKGROUND OF THE INVENTION

Poly(ethylene terephthalate) resins are commonly referred to in the industry as "PET" even through they may and often do contain minor amounts of additional components. PET is widely used to manufacture containers for juice, water, carbonated soft drinks ("CSD") and the like. PET is used for these purposes due to its generally excellent combination of mechanical and gas barrier properties.

The PET containers referred to herein are stretch blow molded containers. As would be recognized by one of ordinary skill in the art, stretch blow molded PET containers are manufactured by first preparing an injection molded preform from PET resin. The PET resin is injected into the preform mold that is of a certain configuration. In prior art methods of container manufacturer, configuration of the preform is dictated by the final bottle size and the properties of the polymer being used to prepare the container. After preparation of the preform, the preform is blow molded to provide a stretch blow molded container.

PET containers must conform to fairly rigid specifications, especially when used to contain and store carbonated beverages in warm climates and/or in the summer months. Under such conditions, the containers often undergo thermal expansion, commonly referred to in the industry as "creep", caused by the high pressure in the container at high temperature. The expansion increases the space between the PET molecules in the side wall of the container thus allowing for CO2 to escape through the side wall faster than under normal conditions. Expansion also increases the head space of the container, which allows carbonation to escape from the beverage into the headspace area. Regardless of how carbonation is released from the beverage while enclosed in a container, loss of carbonation is undesirable because the beverage will taste "flat" when this occurs. Creep increases the interior space in the container which, in turn, reduces the height of the beverage in the container. This reduced height can translate into a perception by the consumer that the container is not completely full and, as such, perception of product quality is reduced.

PET container performance is also relevant in regards to sidewall strength. In storage and transport, filled PET containers are normally stacked with several layers of filled containers on top of each other. This causes significant vertical stress on the container which is manifested in large part against the sidewalls. If there is not sufficient sidewall strength or top load in the PET container, the bottle can collapse in storage or in use.

Moreover, consumer perception of container quality is manifested in the feel of the container when it is being held. When consumer hold a container and squeeze the container, the contain sidewall will deform. If sidewall deflection is too high, the container will feel too soft;, and consumers relate this to a poor quality of products, even though the products are of the same quality as compared with products packed in a stiffer package.

One of ordinary skill in the art would recognize that it is desirable to reduce the amount of PET used in the preparation of PET containers for cost reduction. Lower weight PET containers result in lower material costs, less energy usage during the manufacturing process and lower transport costs. Lighter weighted containers also provide less solid waste and have less negative environmental impact. However, with reducing the amount of PET per container the desired properties mentioned above are also sacrificed, thus achieving a balance between source reduction and performance is difficult to achieve.

Prior art methods of reducing the weight of PET containers generally focus on reduction of the amount of polymer used to prepare the container. The weight of the container can be reduced to an amount that is shown through performance testing to not dramatically sacrifice performance of the containers in use, although some deterioration in container performance are seen with prior art methods of lightweighting where no barrier coating is used. Generally, the above-described container properties are directly related to the amount of PET resin used to prepare the container. In prior art methods of light weighting containers, lower amounts of PET resin used will result in thinner-walled finished containers and will consequently result in lower barrier and strength properties in the finished container. Thus, the tension between maximizing the performance of PET containers while attempting to reduce the weight of PET containers remains a concern, especially in warmer climates.

Energy consumption during the container manufacturing process is directly related to the thickness of the preform, because in a thicker preform there is more polymer mass present to heat and cool. Therefore, one method to reduce energy costs associated with preparation of PET containers is to lightweight the preform by reducing the thickness of the preform. Prior art methods for doing so involve making a core change or a cavity change to the preform design. A core change increases the inside diameter of the preform by hollowing out a portion of the inner wall of the preform. A cavity change does not affect the inner diameter but rather removes a portion of the outer wall of the preform. However, the thickness of the preform is related to, in part, the natural stretch ratio of the polymer being used to prepare the preform. That is, the natural stretch ratio of the polymer determines the stretch ratio of the preform, which is a function of the preform inner diameter correlating to thickness of the preform and height of the preform below the finish. The preform is designed to have a preform stretch ratio that is somewhat higher than the natural stretch ratio of the polymer, thus maximizing the performance of the PET resin by stretching the PET resin beyond its strain hardening point optimizing crystallization and orientation to create haze-free or substantially haze-free containers with acceptable mechanical performance. Increasing the inner diameter of a preform lowers the preform stretch ratio, which affects the final container properties by not maximizing the stretch of the PET resin. Therefore, it has been understood in the prior art that use of PET resin which has a natural stretch ratio typically in the range of about 13 to 16 has limitations in reducing energy costs in the container manufacturing process because the thickness of the preform cannot be effectively reduced.

One prior art method, which has been used to improve container quality, improve the productivity through reduced cycle time by using thinner walled preforms, and lessen energy consumption in manufacture, is to lower the stretch ratio of the polymer allowing for a reduced stretch ratio of the preform. Attempts have been made to lower the stretch ratio of the polymer by modification of the PET resin itself. This has been achieved by increasing the molecular weight or intrinsic viscosity (IV) of the PET resin because higher IV PET resins result in polymers with lower natural stretch ratios. However, when the IV of the PET resin is increased, the polymer will have higher melt viscosity. When higher melt viscosity is present, a higher melt temperature must be used to process the polymer. This results in more energy usage and also more potential for polymer degradation during processing. The higher melt temperature also requires longer cycle time during injection molding. These negative properties resulting from this method to lower the stretch ratio of the polymer thus outweigh any benefits described above in reducing the preform wall thickness.

Lowering of the polymer stretch ratio can also be accomplished by addition of long chain branching. However, like modifying the PET resin IV, this method also increases the melt viscosity of PET and caused the same problem of the high IV polymer. Thus, this method is not desirable.

In view of the above, it would be desirable to develop a preform design that does not result in higher energy consumption during processing. Still further, it would be desirable to develop a preform design that provides good mechanical properties in a finished stretch blow molded container such as, low thermal expansion, good sidewall rigidity and haze-free or substantially haze free containers. Still further, it would be desirable to reduce the energy consumption during injection molding the preform and, therefore, the container manufacturing process. The present invention meets these objectives.

SUMMARY OF THE INVENTION

In one aspect, the present invention relates to preforms for preparing lightweight stretch blow molded containers that have mechanical and thermal properties that are comparable to those of prior art stretch blow molded containers. Yet further, the present invention relates to methods of designing preforms to optimize the stresses placed on a finished container in use.

The present invention provides a preform design with certain hoop ratio and axial ratio limitations that allows the production of a lightweight stretch blow molded container with thermal and mechanical properties comparable or superior to standard weight stretch blow molded containers made from the same material where such container uses PET resins available in the prior art. This invention also encompasses a method of making such preforms and stretch blow molded containers and methods of making the same.

According to this invention, by increasing stretching in the hoop direction a container can be made with conventional container grade PET copolymer (hereinafter "CG PET copolymer or conventional PET") to have higher mechanical strength. The inventors have discovered that by increasing the hoop stretch ratio without a significant change in the axial stretch ratio, a preform can be made that is lighter weight with comparable strength or in some instances increased mechanical strength. In a further aspect, the inventors have identified a novel preform design that can be used to prepare conventional PET stretch blow molded containers with excellent properties using a reduced amount of polymer in the preparation thereof as compared to a preform with a conventional design.

More particularly, this invention encompasses an injection molded preform for making a stretch blow molded container having an overall stretch ratio of from about 12 to about 16, wherein the overall stretch ratio is a product of a hoop stretch ratio and an axial stretch ratio, wherein the hoop stretch ratio is from about 5.6 to about 6.5, wherein the axial stretch ratio is from about 2.4 to about 2.7, and wherein the preform comprises a CG PET copolymer having a free blow volume of from about 650 to about 800 ml measured at 100° C. and 90 psi using a 25 gram weight preform designed for a 500 ml container with a maximum diameter of 65 mm and a height of 200 mm from below the container finish and having a hoop stretch ratio of 5.5 and an axial stretch ratio of 2.6. Furthermore, this invention encompasses a container made by blow molding such a preform. In a preferred embodiment, the preform comprises an open ended mouth forming portion, an intermediate body forming portion, and a closed base forming portion.

Additional advantages of the invention will be set forth in part in the detailed description, which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory aspects of the invention, and are not restrictive of the invention, as claimed.

DETAILED DESCRIPTION OF THE INVENTION

Figure 1:
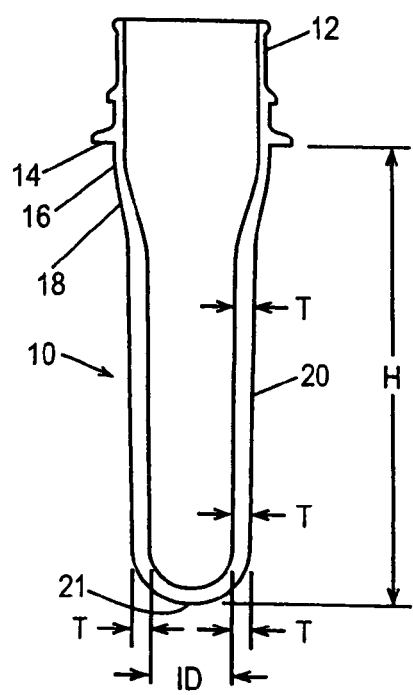
FIG. 1 is a sectional elevation view of an injection molded preform made with the conventional container grade PET Copolymer in accordance with a preferred embodiment of this invention.

The present invention may be understood more readily by reference to the following detailed description of the invention and the examples provided herein and the Figures discussed herein. It is to be understood that this invention is not limited to the specific methods, formulations, and conditions described, as such may, of course, vary. It is also to be understood that the terminology used herein is for the purpose of describing particular aspects only and is not intended to be limiting.

In this specification and in the claims that follow, reference will be made to a number of terms, which shall be defined to have the following meanings.

The singular forms "a," "an," and "the" include plural referents unless the context clearly dictates otherwise.

Ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

"Optional" or "optionally" means that the subsequently described event or circumstance may or may not occur, and that the description includes instances where said event or circumstance occurs and instances where it does not. For example, the phrase "optionally comprising an ingredient" means that the composition may comprise that ingredient and that the description includes both compositions comprising that ingredient and compositions without that ingredient.

The present invention provides a preform design with certain hoop ratio and axial ratio limitations that allows the production of a lightweight stretch blow molded container with thermal and mechanical properties comparable or superior to standard weight stretch blow molded containers made from the same material where such container uses PET resins available in the prior art. This invention also encompasses a method of making such preforms and stretch blow molded containers and methods of making the same.

According to this invention, by increasing stretching in the hoop direction, a container can be made with conventional container grade PET copolymer to have higher mechanical strength. The inventors have discovered that by increasing the hoop stretch ratio without a significant change in the axial stretch ratio, a preform can be made that is lighter weight with comparable strength or in some instances increased mechanical strength. In a further aspect, the inventors have identified a novel preform design that can be used to prepare conventional PET stretch blow molded containers with excellent properties using a reduced amount of polymer in the preparation thereof as compared to a preform with a conventional design.

In describing the present invention, a container grade PET copolymer (hereinafter "CG PET copolymer") is defined as having a free blow volume of from about 650 to about 800 milliliters (ml) measured at 100° C. and 90 psi using a 25 gram weight preform designed for a 500 ml container with a maximum diameter of 65 mm and a height of 200 mm from below the container finish and having a hoop stretch ratio of 5.5 and an axial stretch ratio of 2.6. This CG PET copolymer will also be referred to herein as conventional PET.

CG PET copolymer is contrasted with low natural stretch ratio copolymer (hereinafter "LNSR PET copolymer") which is defined as having a free blow volume of from about 400 to less than about 650 ml measured at 100° C. and 90 psi using a 25 gram weight preform designed for a 500 ml container with a maximum diameter of 65 mm and a height of 200 mm from below the container finish and having a hoop stretch ratio, of 5.5 and an axial stretch ratio of 2.6. A copending patent application titled "Preform For Low Natural Stretch Ratio PET Copolymer, Container Made Therewith and Methods" and filed on May 11, 2005, the disclosure of which is expressly incorporated herein by reference, discloses a preform having a reduced stretch ratio with certain hoop ratio and axial ratio limitations made from an LNSR polymer having a lower natural stretch ratio over preforms made from PET resin available in the prior art. This reference also discloses a stretch blow molded container having excellent mechanical properties, in particular a beverage container, made from this preform design. Also, this reference discloses a clear container or substantially clear, haze-free or substantially haze free stretch blow molded containers. Furthermore, The LNSR polymer is separately disclosed and claimed in copending U.S. patent application Ser. No. 10/967,803 filed in the U.S. Patent and Trademark Office on Oct. 18, 2004, which is a continuation of U.S. patent application Ser. No. 10/696,858 filed in the U.S. Patent and Trademark Office on Oct. 30, 2003, which claims priority under 35 U.S.C. §119 to U.S. provisional patent application Ser. No. 60/423,221 filed on Nov. 1, 2002, the disclosures of which applications are also expressly incorporated herein by reference in their entirety.

The free blow volume has a relational value to the natural stretch ratio of the polymer, which is more difficult to measure and requires special instrumentation. The free blow volume measurement of a neat polymer, as shown in the Examples herein, provides a method to measure the natural stretch ratio of a polymer. The natural stretch ratio of a polymer influences the preform design by determining the minimum stretch ratio limitations imparted to the preform by the polymer properties in the blow molding process. Thus, the free blow volume is the method chosen herein to describe the natural stretch ratio of the polymer. A standard 25 gram weight preform designed for a 500 ml container with maximum diameter of 65 mm and height of 200 mm below the container finish and having a hoop stretch ratio of 5.5 and an axial stretch ratio of 2.6 was chosen as the base measurement and standard test conditions of 100° C. and 90 psi were used, as shown in Example 1. For the container grade PET copolymer with the free blow volume in the range described above, the natural stretch ratio of such copolymer is from about 12 to 16. For the LNSR PET copolymer with the free blow volume in the range described above, the natural stretch ratio for such copolymer is from about 8 to about 12.

The preform stretch ratio is another valued used to describe the inventions herein. The preform stretch ratio refers to the nomenclature that is well known in the art and is defined according to the following formulas:

Overall stretch ratio=[(maximum internal container diameter/internal preform diameter)]×[height of container below finish)/(height of preform below finish)]    (1)

Hoop stretch ratio=(maximum internal container diameter/internal preform diameter)    (2)

Axial stretch ratio=(height of container below finish/height of preform below finish)    (3)

Or, in an alternate presentation, overall stretch ratio=hoop stretch ratio×axial stretch ratio    (4)

To maximize the performance characteristics of a particular polymer the preform design must be such that the preform overall stretch ratio is greater than the natural stretch ratio of the PET copolymer. Using the above calculations, it would be recognized that there are virtually unlimited ways to obtain or design a specified preform stretch ratio for use with a particular PET copolymer. However, the inventors herein have determined that, although one can modify both axial and hoop stretch ratios to provide a specified preform overall stretch ratio, in accordance with the present invention there is a relationship that must be followed to achieve the optimum mechanical properties and barrier performance in the resulting container.

According to one aspect of this invention, the injection molded preforms of the present invention for making a stretch blow molded container for use with a CG PET copolymer are designed to have overall stretch ratios of from about 12 to about 16, or from 12 to 16. In particular, within these specified overall stretch ratios, the hoop stretch ratio is from about 5.6 to about 6.5, or from 5.6 to 6.5, or from about 5.7 to about 6.5. The axial stretch ratio is from about 2.4 to about 2.7, or from 2.4 to 2.7. The CG PET copolymer has a free blow volume of from about 650 to about 800 ml measured at 100° C. and 90 psi using a 25 gram weight preform designed for a 500 ml container with a maximum diameter of 65 mm and a height of 200 mm from below the container finish and having a hoop stretch ratio of 5.5 and an axial stretch ratio of 2.6. In another aspect, the CG PET has a free blow volume of from about 650 to about 750 ml.

By varying the hoop and axial stretch ratios within these ranges to provide the specified overall stretch ratios formula, it has been found by the inventors herein that stretch blow molded containers having improved properties, such as greater thermal stability, lighter in weight, and lower energy consumption, can be provided. These property improvements result in a number of benefits to a beverage product contained within the container such as, for example, improvements in beverage shelf life. Clear or substantially clear preforms and stretch blow molded containers are also found with this invention.

In a stretch blow molded container, the container generally conforms to the shape of a cylinder. As a result of this generally cylindrical shape, stresses placed on the structure during use, especially during the use of the carbonated soft drink are different in the hoop direction as in the axial direction. Generally speaking, the stress on the hoop direction is about twice as much as that on the axial direction. For carbonated soft drink, the stresses on the container sidewall caused by the internal pressure can cause the container to stretch. This phenomenon is also known as creep to those skilled in the art. Creep is bad for the product quality as well as the container quality. In particular, creep increases the volume of the container which, in turn, reduces the apparent fill level of the container. This can cause the false perception to the consumers that there is less product in the container. Creep can cause container deformation changing the container shape, which in many cases is representative of a brand. Creep also increases the head space volume of the CSD. This causes the $CO_2$ to go from the beverage to the head space, and therefore reduce the amount of the $CO_2$ in the beverage. Since the shelf life of the CSD is determined by the amount of $CO_2$ in the beverage, the increased head space volume dramatically reduce the shelf life of the CSD product. Heat exacerbates this phenomenon causing even more thermal expansion or creep.

A conventional preform designed for a CG PET copolymer typically has an overall stretch ratio of about 12 to about 16, a hoop stretch ratio in the range of 4.3 to 5.5 and the axial stretch ratio in the range of 2.4 to 2.8. The inventors found that it is possible to increase the hoop stretch of the preform to achieve higher orientation in this direction, while reducing the axial stretch to reduce the orientation in this direction. By doing so, a higher degree of hoop orientation is achieved. Since the orientation of the container is related to the preform stretch ratio, the higher hoop stretch can increase the orientation in the hoop direction, and thus reduce the deformation in the hoop direction. From this discovery, it has been found that it can be beneficial to stretch the preform in the hoop direction to a greater degree than in the axial direction. In so doing, it has been found that a greater stretching in the hoop direction improves the orientation of the resulting beverage container, thus resulting in improved properties in the container.

This lightweight container made from the preform design of the present invention surprisingly exhibits properties, such as higher sidewall rigidity, that are equal to or better than those exhibited in beverage containers made from preforms with conventional designs at heavier weight. In particular, the stretch blow molded containers of the present invention are at least by weight lighter than stretch blow molded containers prepared from CG PET copolymer (i.e. conventional PET) and using conventional designs of preforms. That is, a container made from a present invention preform design has at least 5% reduction in weight as compared to a second container having the same volume made from a preform having an overall stretch ratio of about 12 to about 16, an axial stretch ratio of from about 2.4 to about 2.8, and a hoop stretch ratio of from about 4.3 to about 5.5 (hereinafter "conventional design"). In another aspect, the preform design has at least 10% reduction in weight. Such inventive lightweight containers exhibit mechanical and thermal properties that are equal to or better than prior art stretch blow molded containers. Moreover, haze free or substantially haze free containers are obtained.

It has been found that the physical dimensions of the preform can be altered so as to make a lighter weight preform than is normally possible in the prior art to make the same container with the similar physical properties. Although this preform is lighter weight, it has been surprisingly found that the resulting container exhibits an acceptable level of strength and also provides comparable container sidewall rigidity in comparison to containers made from conventional PET using the conventional design of a preform with conventional weight. This design of the present invention is not recommended for use with conventional weight preforms. This design of the present invention is specifically designed for light weight purpose. Otherwise, if used with conventional weight preforms the sidewall thickness is too thick resulting in cycle time penalties.

Using the present invention preform design methodology discussed herein, a container can be produced with reduced amount of polymer present and still obtain comparable properties in the finished container properties as compared to prior art lightweighting procedures. Such containers are lightweight, but nonetheless exhibit improved mechanical and thermal properties having enhanced mechanical properties, higher crystallinity, and improved shelf-life can be made utilizing preforms having stretch ratios of from about 12 to about 16.

This present invention preform design differs from prior art preform design techniques because the preform conforming to the specified formula varies the hoop stretch ratio and axial stretch ratio in a non-proportional manner. This provides a finished stretch blow molded container with a hoop and an axial stretch ratio that enhances the sidewall rigidity of the finished stretch blow molded container.

Turning to the FIG. 1, a preform 10 having a conventional design is illustrated in FIG. 1. The dimensions in FIG. 1 are not drawn to scale.

The preform 10 is made by injection molding a CG PET copolymer in one aspect of the present invention. Such preforms comprise a threaded neck finish 12 which terminates at its lower end in a capping flange 14. Below the capping flange 14, there is a generally cylindrical section 16 which terminates in a section 18 of gradually decreasing external diameter so as to provide for an increasing wall thickness. Below the section 18 there is an elongated body section 20. The height of the preform is measured from the capping flange 14 to a closed end 21 of the elongated body section 20.

Figure 2:
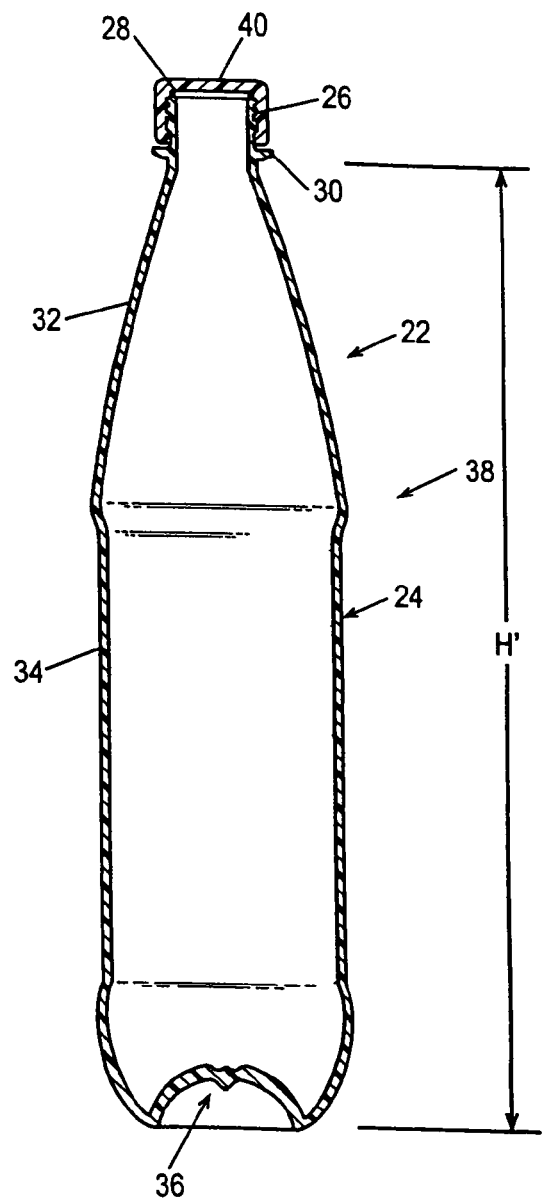
FIG. 2 is a sectional elevation view of a blow molded container made from the preform of FIG. 1 in accordance with a preferred embodiment of this invention.

The preform 10 illustrated in FIG. 1 is blow molded to form a container 22 illustrated in FIG. 2. The container 22 comprises a shell 24 comprising a threaded neck finish 26 defining a mouth 28, a capping flange 30 below the threaded neck finish, a tapered section 32 extending from the capping flange, a body section 34 extending below the tapered section, and a base 36 at the bottom of the container. The height of the container is measured from the capping flange 30 to a closed end at the base 36. The container 22 is suitably used to make a packaged beverage 38, as illustrated in FIG. 2. The packaged beverage 38 includes a beverage such as a carbonated soft drink beverage disposed in the container 22 and a closure 40 sealing the mouth 28 of the container.

In one aspect of the present invention, the intermediate body forming portion of the inventive preforms can have a wall thickness from about 1.5 to about 8 mm. The intermediate body forming portion of the preform can also have an inside diameter from about 10 to about 30 mm, and the height of the preform, which extends from the closed end of the preform opposite the finish to the finish, is from 50 to 150 mm. In one aspect, containers made in accordance with some aspects of this invention can have a volume within the range from about 0.25 to about 3 liters and a wall thickness of about 0.25 to about 0.65 mm. However, it is important to note that in relation to the preform design of the present invention, the overall stretch ratio and the axial and hoop stretch ratios must vary in accordance with the formulas stated herein.

In this specification, reference is made to dimensions of the preform 10 and the resulting containers 22. The height H of the preform is the distance from the closed end 21 of the preform opposite the finish 12 to the capping flange 14 of the finish. The internal diameter ID of the preform 10 is the distance between the interior walls of the elongated body section 20 of the preforms. The wall thickness T of the preform 10 is measured at the elongated body section 20 of the preforms also. The height H' of the container 22 is the distance from the closed end of the base 36 of the container opposite the finish 26 to the capping flange 30 of the finish. The maximum internal container diameter MD is the diameter of the container at its widest point along the height of the container 22. The hoop stretch ratio of the preforms equals the maximum internal container diameter divided by the internal preform diameter and the axial stretch ratio equals the height of container below the finish divided by the height of preform below the finish. The overall stretch ratio of the preforms equals the product of the hoop stretch ratio and the axial stretch ratio.

The preform 10, container 22, and packaged beverage 38 are but exemplary embodiments of the present invention. It should be understood that the CG PET copolymer that comprises one aspect of the present invention can be used to make a variety of preforms and containers having a variety of configurations.

The inventors have surprisingly determined that the novel method of preform design can be used to prepare improved preform designs using CG PET copolymers, which is PET having stretch ratios higher than the LNSR PET polymer described hereinabove and in the copending patent application. The inventive preform design methodology can be used to prepare lightweight stretch blow molded containers from CG PET copolymer. Examples of CG PET copolymers useful for the present invention preform design include PET copolymers having modification from about 1 to about 5 mole %, or from 1 to about 3 mole % 1,4-cyclohexane dimethanol modification, or alternatively, from about 1 to about 5 mole %, or from 1 to about 3 mole % isophthalic acid or naphthalene dicarboxylic acid modification. In a further aspect, CG PET copolymer means PET in which DEG is a natural by-product of the PET manufacturing process and this DEG is not removed prior to use thereof. Such DEG content is greater than about 2.4 mole % DEG, or greater than about 3 mole % DEG. As discussed previously, DEG is thought by those of ordinary skill in the art to be a harmless by-product of the PET manufacturing process. As such, PET commonly used to prepare beverage containers necessarily contains DEG. Until the invention described herein, it has not been possible to prepare commercially acceptable lightweight stretch blow molded containers from such conventional PET because the thinner walls that resulted from reduced polymer content did not provide suitable performance in the finished container.

In another aspect of the present invention, a method for making a container is provided, wherein the method comprises blow molding an injection molded preform having the relationships of hoop, axial and overall stretch ratios of the preform design of the present invention for use with CG PET copolymer as described elsewhere herein.

To understand the significance of one aspect of the present invention, a summary of the conventional process of making stretch blow molded containers is provided. First, PET pellets obtained from a conventional polyester esterification/polycondensation process are melted and subsequently formed into preforms through an injection molding process using known processes. Second, the preforms are heated in an oven to a temperature above the polymer Tg, and then formed into containers via a known blow molding process. The desired end result is clear preforms and clear containers with sufficient mechanical and barrier properties to provide appropriate protection for the contained beverage or food product stored within the container.

As would be understood by one of ordinary skill in the art, an important consideration in producing clear or transparent containers is to first produce clear or transparent preforms. During the injection molding step, thermally induced crystallization can occur during the conversion of the polymer to a preform. Thermally induced crystallization can result in the formation of large crystallites in the polymer, along with a concomitant formation of haze. In order to minimize the formation of crystallites and thus provide clear preform, the rate of thermal crystallization should be slow enough so that preforms with few or no crystallites can be produced. However, if the rate of thermal crystallization is too low, the production rates of PET resin can be adversely affected, since PET must be thermally crystallized prior to solid-state polymerization, a process used to increase the molecular weight of PET and simultaneously remove unwanted acetaldehyde. Solid state polymerization increases the molecular weight of the polymer so that a container made from the polymer will have the requisite strength.

Prior art techniques for reducing thermal crystallization rate include the use of PET containing a certain amount of co-monomers. The most commonly used comonomer modifiers are isophthalic acid or 1,4-cyclohexanedimethanol, which are added at levels ranging from 1.5 to 3.0 mole %.

Counterbalancing the need to reduce the rate of thermal crystallization during injection molding is the need to increase the rate of strain-induced crystallinity that occurs during blow molding. Strain-induced crystallization results from the rapid mechanical deformation of PET, and generates extremely small, transparent crystallites. The amount of crystallites present in the container sidewall correlates generally with the strength and barrier performance of the container.

In particular, prior art methods of preform design have been based upon either core change or cavity change, or a redesign of preform with similar hoop and axial stretch ratio in the conventional preform designs. These prior art designs do not account for the differing stresses exerted in the hoop and axial directions in a finished container. The inventors herein have determined that due to the differing stresses exerted in a finished container, there need be more hoop stretch than axial stretch.

With the balance between axial stretch and hoop stretch ratios provided with the present design when varied within the specified overall stretch ratio, the preforms are easily stretched. At the same time hoop orientation is maximized, the thermal and mechanical properties of the resulting stretch blow molded container.

Additionally, using the present invention preform design with CG PET copolymer, it has been found that lightweight containers can be made having the same or similar sidewall rigidity and thermal expansion characterizations. As prior art conventional containers of higher weight.

The light weighting potential for a container using the inventive preform design can be illustrated with two tests:

thermal expansion and sidewall deflection as described in the Examples presented herein below. Both tests demonstrate the mechanical properties of the containers. Thermal expansion is a reflection of thermal expansion, and sidewall deflection is a reflection of sidewall rigidity, respectively. Regardless of preform design, for the same resin composition, a lighter weight bottle generally exhibits lower mechanical strength, poorer thermal stability (and concomitantly greater thermal expansion), and less sidewall rigidity (or greater sidewall deflection). Improved performance in both thermal stability and sidewall rigidity can substantially decrease creep, which is the dimensional change under stress of a container measured by the change in diameter and height. This can be an important factor in use, especially for carbonated soft drink, because most containers undergo some stress during and after the filling process, in particular mechanical stress and stress from heating. Also, excessive temperatures during storage and transport can also put mechanical stresses on the container. Therefore, thermal expansion and sidewall deflection tests are used herein to compare the performance of containers, and especially the performance of pressurized containers.

The preform designs of the present invention can be used to make stretch blow molded containers. Such containers include, but are not limited to, bottles, drums, carafes, and coolers, and the like. As is well known to those skilled in the art, such containers can be made by blow molding an injection molded preform. Examples of suitable preform and container structures and methods for making the same are disclosed in U.S. Pat. No. 5,888,598, the disclosure of which is incorporated herein by reference in its entirety. Other preform and stretch blow molded container structures known to one of skill in the art can also be prepared in accordance with the present invention.

The present invention is described above and further illustrated below by way of examples, which are not to be construed in any way as imposing limitations upon the scope of the invention. To the contrary, it is to be clearly understood that resort may be had to various other embodiments, modifications, and equivalents thereof which, after reading the description herein, may suggest themselves to those skilled in the art without departing from the spirit of the present invention and/or scope of the appended claims.

EXAMPLES

The following Examples are put forth so as to provide those of ordinary skill in the art with a complete disclosure and description of preform design of the present invention for light weighting of a PET bottle using conventional PET, and are intended to be purely exemplary of the invention and are not intended to limit the scope of what the inventors regard as their invention. Efforts have been made to ensure accuracy with respect to numbers (e.g., amounts, temperature, etc.) but some errors and deviations should be accounted for. Unless indicated otherwise, parts are parts by weight, temperature is in ° F. or is at room temperature, and pressure is at or near atmospheric.

Example 1

Different PET resins were dried overnight at 135° C. in a vacuum oven to achieve a moisture level below 50 ppm prior to injection molding. The injection molding was performed with a lab-scale Arburg unit cavity injection machine into conventional preform molds using a 25 gram weight preform designed for a 500 ml container with a maximum diameter of 65 mm and a height of 200 mm from below the container finish and having a hoop stretch ratio of 5.5 and an axial stretch ratio of 2.6. The preforms were then free blown to bubbles to determine the stretch ratio of each polymer. Free blow was performed on each preform variable and the bubbles were blown at temperatures of 100° C. and 90 psi. The free blow volume is an indication of the natural stretch ratio of the PET, and is recorded for each bubble. The higher the free blow volume, the higher the natural stretch ratio of the PET.

TABLE 1

Free blow results of the LNSR PET copolymer and the CG PET Copolymer

| Resin Composition | | | |
|---|---|---|---|
| mole % IPA | mole % DEG | mole % NDC | Free blow volume (ml) |
| 3 | 2.80 | 0 | 713 |
| 0 | 1.60 | 0.25 | 542 |
| 0 | 1.60 | 0.50 | 520 |
| 0 | 1.60 | 1.00 | 560 |
| 0.50 | 1.60 | 0 | 529 |

The first resin with 3 mole % IPA and 2.8 mole % of DEG is a CG PET copolymer or conventional PET copolymer. It is seen from Table 1 that the other resins have reduced free blow volume and thus exhibit a lower natural stretch ratio than that of the conventional PET copolymer.

Example 2

A 26.5 g preform and a 23-g preform were designed for 600 ml PET bottle. The stretch ratios of the two preform designs are shown in Table 2. The 26.5 g preform was obtained through a core change from a 28-g preform used to produce the 600 ml bottles.

TABLE 2

|  | 26.5 g preform core change design (comparative) | 23 g preform invention design |
|---|---|---|
| Hoop stretch ratio | 4.67 | 5.98 |
| Axial stretch ratio | 2.80 | 2.60 |
| Overall stretch ratio | 13.1 | 15.5 |

Example 3

A commercially available grade PET suitable for use in preparing a CSD container with an IV of 0.84 was dried overnight at 135° C. in a vacuum oven to achieve a moisture level below 50 ppm prior to injection molding. This resin is considered to be "conventional" according to the present disclosure because this resin is not treated to remove residual DEG derived from the manufacturing process. The injection molding was performed with a lab-scale Arburg unit cavity injection machine into both 26.5 g and 23 g preform molds. The preforms were then blow molded into 600 ml contour bottles with a Sidel SBO 1 machine.

Example 4

A thermal stability test was performed on the bottles from Example 3 as follows:

The "as received" test bottle dimensions and thickness are measured. Bottles are then filled with water carbonated to 4.1+/−0.1 volumes and capped. The filled bottles are exposed to ambient temperature overnight, and the dimensions are measured to determine percent change. The bottles are exposed at 38° C., and the dimensions are measured to determine percent change.

The critical dimensional change is listed in Table 3.

TABLE 3

Thermal stability of bottles made with conventional PET

| Bottle description | Label diameter change % | Filling point drop (in) | Height change % |
|---|---|---|---|
| 26.5 g bottle w/ core change preform | 2.72% | 1.115 | 1.6% |
| 23 g bottle with invention preform | 1.50% | 1.069 | 2.5% |

The above results demonstrate that the 23-g bottles passed had fewer dimensional changes during stability testing. In particular, the 26.5-g bottles are much heavier (i.e. thicker walled) than the 23 g bottles and are therefore were expected to perform much better in the thermal stability test. Surprisingly, the lighter PET container prepared using the inventive preform design exhibited significantly better thermal stability than this heavier container. This result shows that the inventive preform design methodology can be used to prepare lightweight stretch blow molded containers with surprisingly good thermal stability.

Example 5

Environmental Stress Cracking Resistance

The bottles of Example 4 were subjected to the accelerated stress cracking test as described below. For the accelerated stress crack resistance testing, twenty-five (25) samples of each variable were randomly selected and carbonated to 4.1-4.5 volumes of $CO_2$. The samples were stored for 24 hours at 72° F. and 50% RH. The base area of each of these bottles was then immersed in a dilute sodium hydroxide (0.1%) solution. Each bottle was then carefully examined over the course of 3 hours in order to detect carbon dioxide leakage through base cracks or for catastrophic base failure. If any carbonation leakage or base breakage is detected, the time to this failure point is recorded.

TABLE 4

Accelerated stress cracking

| Bottle description | Average time to failure (hour) | % of bottles passed the 3 hr. test |
|---|---|---|
| 26.5-g bottle with core change design | 3.23 | 56% |
| 23-g bottle with invention design | 3.23 | 80% |

As can be seen from Table 4, the 23-g bottles outperformed 26.5-g bottles even though the 26.5-g bottles are much heavier, and expected to last longer in the caustic stress cracking test. This test result shows that stretch blow molded containers prepared from conventional PET using the inventive preform design methodology exhibit improved mechanical properties over containers prepared from prior art preform designs. This result is surprising because it would be expected that the thicker 26.5 g containers would perform better. This result further confirms the excellent results seen with the inventive preform design methodology.

It will be apparent to those skilled in the art that various modifications and variations can be made in the present invention without departing from the scope of the invention. Other aspects of the invention will be apparent to those skilled in the art from consideration of the specification and practice of the invention disclosed herein. It is intended that the specification and examples be considered as exemplary only.

We claim:

1. A stretch blow molded container prepared from an injection molded preform having an overall stretch ratio of the container relative to the preform of from about 12 to about 16,
    wherein the overall stretch ratio is a product of a hoop stretch ratio and an axial stretch ratio,
    wherein the hoop stretch ratio of the container relative to the preform is from about 5.6 to about 6.5,
    wherein the axial stretch ratio of the container relative to the preform is from about 2.4 to about 2.7, and
    wherein the preform comprises a container grade PET Copolymer, wherein the container grade PET Copolymer has a free blow volume of from about 650 to about 800 ml measured at 100° C. and 90 psi using a 25 gram weight preform designed for a 500 ml container with a maximum diameter of 65 mm and a height of 200 mm from below the container finish and having a hoop stretch ratio of 5.5 and an axial stretch ratio of 2.6.

2. The stretch blow molded container of claim 1, wherein the hoop stretch ratio of the container relative to the injection molded preform is from about 5.7 to about 6.5.

3. The stretch blow molded container of claim 1, wherein the free blow volume of the container grade PET Copolymer is from about 650 to about 750 ml.

4. The stretch blow molded container of claim 1, comprising from about 23 to about 25 g of the container grade PET Copolymer, wherein the volume of the stretch blow molded container is from about 450 to about 650 ml.

5. The stretch blow molded container of claim 1, having at least a 5% reduction in weight as compared to a second container, wherein the second container comprises the same container grade PET Copolymer as the stretch blow molded container and has the same volume as the stretch blow molded container, wherein the second container is made from a second preform having an overall stretch ratio of the second container relative to the second preform of about 12 to about 16, an axial stretch ratio of the second container relative to the second preform of from about 2.4 to about 2.8, and a hoop stretch ratio of the second container relative to the second preform of from about 4.3 to about 5.5, wherein the stretch blow molded container has mechanical and/or thermal properties that are equal to or better than the second container.

6. The stretch blow molded container of claim 5, having at least 10% reduction in weight.

* * * * *